United States Patent [19]

Satkowski et al.

[11] 4,079,086

[45] Mar. 14, 1978

[54] PROCESS FOR REACTING ALKYL EPOXIDES WITH GLYCOLS

[75] Inventors: William B. Satkowski; Richard J. Day; Chung Y. Shen, all of St. Louis, Mo.

[73] Assignee: Monsanto Company, St. Louis, Mo.

[21] Appl. No.: 753,043

[22] Filed: Dec. 22, 1976

Related U.S. Application Data

[63] Continuation of Ser. No. 572,573, Apr. 28, 1975, abandoned.

[51] Int. Cl.² .............................................. C07C 41/02
[52] U.S. Cl. .............................. 260/615 R; 260/615 B
[58] Field of Search ........................ 260/615 R, 615 B

[56] References Cited

U.S. PATENT DOCUMENTS

| 2,679,522 | 5/1954 | DeGroote ..................... 260/615 B X |
| 2,782,240 | 2/1957 | Hefner et al. ..................... 260/615 B |
| 2,807,651 | 6/1957 | Britton et al. ................. 260/615 B X |
| 2,814,613 | 11/1957 | Desty et al. ................. 260/615 B X |
| 3,240,819 | 3/1966 | Gaertner et al. ................. 260/615 B |
| 3,406,208 | 10/1968 | Blaser et al. ..................... 260/615 B |
| 3,607,778 | 9/1971 | Lincoln et al. ........... 260/615 B UX |
| 3,931,338 | 1/1976 | Rupilius ........................... 260/615 R |

FOREIGN PATENT DOCUMENTS

| 1,150,345 | 4/1969 | United Kingdom ............. 260/615 B |

*Primary Examiner*—Howard T. Mars
*Attorney, Agent, or Firm*—N. E. Willis; E. P. Grattan; F. D. Shearin

[57] ABSTRACT

Improvements in the reaction of epoxyalkanes with glycols are provided by conducting the reaction in non-polar solvents.

3 Claims, No Drawings

PROCESS FOR REACTING ALKYL EPOXIDES WITH GLYCOLS

This is a continuation of application Ser. No. 572,573, filed Apr. 28, 1975 and now abandoned.

BACKGROUND OF THE INVENTION

The present invention relates to improved processes for reacting alkyl epoxides with glycols to form alkanes vicinally substituted with hydroxy and alkyl hydroxy alkoxylate groups.

It is known that alkanes (particularly those of 10 to 18 carbon chain length) vicinally substituted with hydroxy and alkyl hydroxy alkoxylate groups possess surfactant properties and are useful in a variety of applications such as ingredients for detergent formulations.

Methods of preparing such vicinally substituted compounds by the reaction of a glycol with an alkyl epoxide in the presence of an acidic catalyst are known to those skilled in the art. R. E. Parker and N. S. Issacs, Chem. Rev. p. 741 (1959) point out that the vast majority of epoxide reactions have been studied in solution and that almost all the reactions involve the opening of the epoxide ring and the addition of a molecule of reagent. It is noted that the ring-opening reactions of epoxides take place by ionic mechanisms and, since the bond which is broken is the highly polar carbon-oxygen bond, that the reactions are generally carried on in polar solvents.

Although reactions of the type described above readily produce the desired product, significant amounts of undesired by-products are often formed. Thus, improved reactions in which the formation of undesired by-products are minimized are desired by those skilled in the art.

SUMMARY OF THE INVENTION

The present invention provides novel processes for the reaction of glycols and alkyl epoxides. In accordance with the process of this invention, the reaction is conducted in a non-polar solvent as hereinafter described. In many instances, this results in significant reductions in the amounts of by-products formed as compared to the hitherto conventional practice of conducting such reactions in polar solvents.

The invention will be understood from the following description of the preferred embodiments.

DESCRIPTION OF THE PREFERRED EMBODIMENTS

In the practice of the present invention, alkyl epoxides are reacted with glycols in the presence of an acidic catalyst, the reaction being conducted in a non-polar solvent.

Preferred epoxides for use in the reaction are represented by the formula

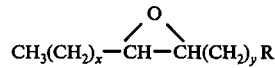

wherein $x$ and $y$ are each integers from 0 to 15, the sum of $x$ and $y$ being from 6 to 15, and R is hydrogen or methyl.

Preferred glycols for use in the reaction are represented by the formula

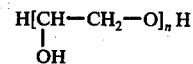

wherein $n$ is an integer from 1 to 5.

The reaction can be effectively catalyzed with any non-oxidizing strong acid, for example, sulfuric, phosphoric, toluene-sulfonic acids, or strong cationic exchange resin. Generally, the use of sulfuric or toluene-sulfonic acid is preferred from the standpoint of cost or solubility.

The reaction will be conducted in a non-polar solvent which will be a saturated cyclic, saturated acyclic, or aromatic hydrocarbon containing from 5 to 12 carbon atoms. Lower carbon members are generally preferred for ease of removal by distillation. Suitable solvents include, for example, benzene, toluene, pentane, hexane, etc. The use of benzene as a solvent is particularly preferred.

Since it is known that benzene in the presence of acid catalyst undergoes Friedel Craft's reactions with epoxides (see Shibata et al, Bull. Jap. Petrol. Inst., pages 25 through 30 (1965)) it is most unexpected that the use of benzene as a solvent would reduce by-product formation or that any non-polar solvent could be advantageously utilized in view of the previously discussed teachings of Parker et al.

The solvent should constitute at least 5 percent by weight of the reaction mixture, preferably from 30 to 50 percent by weight. If lower amounts of solvent are used, larger amounts of undesirable by-products are formed. If greater amounts of solvent are used, the rate of reaction tends to be slowed due to dilution effect and lowering of the boiling point of the reaction mixture.

It is preferred that the mole ratio of glycol to epoxide in the reaction mixture be at least 3 to 1 preferably 8 to 1 or higher. The use of lesser amounts of glycol tends to result in undue dimer formation. There is no theoretical upper limit on the amount of glycol which can be employed, however, ratios greater than 32 to 1 appear to provide no additional advantage and in some instances may tend to reduce reaction rates by dilution effect.

It is found that the reaction rate increases with temperature. Therefore, it is generally preferred to conduct the reaction at the maximum convenient temperature below the temperature at which significant decomposition of reactant or product takes place. Generally, the reactions proceed quite readily at the reflux temperature of the reaction mixture. This reflux temperature can generally be increased somewhat by minimizing the amount of solvent used in the reaction mixture as discussed above. If desired, the reaction can be conducted under super atmospheric pressure to permit employment of higher temperatures.

The glycols are generally relatively insoluble in non-polar solvent. Therefore, most of the excess glycol can be separated from the reaction mixture as a heavier phase and recycled. This constitutes a significant advantage compared to polar solvents since, when a polar solvent such as dimethyl formamide is used, the reaction mixture is a homogeneous solution and costly distillation is required to separate excess glycols.

EXAMPLE I

A mixture of 0.6 mole (about 151 gms) of a mixture of isomers of internal epoxyhexadecane, 1.3 mole of benzene and 4.8 mole of ethylene glycol is heated to reflux.

When reflux begins, a small amount of concentrated sulfuric acid (0.1 gms) is added. After two hours of reflux, the reaction mixture is cooled to room temperature, and separated into two layers. The bottom layer which contains most of the excess glycol and sulfuric acid is easily drained off. The top layer contains all the vicinal hydroxy, hydroxyethyl substituted hexadecane product and is obtained at about 95% yield. Only about 5% by-products such as ketone and higher condensation products are formed.

When the reaction is repeated without the use of benzene, the yield is only 73% and there is a significant increase of the formation of ketone.

EXAMPLE II

The procedure of Example I is repeated except that the reaction is run under a pressure of about two atmosphere (with a higher reflux temperature resulting). The reaction time is shortened to less than one hour and a slightly higher yield (96%) of the product and correspondingly lower amounts of by-products are obtained. (The reaction can be run under about 20 atmosphere pressure in a tubular reactor at a temperature of about 150° C. with a total reaction time of a few minutes. With such a very short reaction time, the yield of product is even higher (about 97%)).

EXAMPLE III

The procedure of Example I (using the higher pressure and reflux temperature) is repeated except that the amount of benzene is varied to provide epoxide to benzene ratios of 90/10, 80/20, 70/30, 60/40 and 50/50. The reaction times required for completion of the reaction is found to be 0.4, 0.5, 1, 2 and 4 hours, respectively. There is substantially no change in the product yield for the ratios of 70/30 and 50/50. The yield at the 80/20 ratio shows a sign of decline and is about 2% lower than at the 70/30 ratio. The yield is further decreased by about 7% at the 90/10 ratio.

What is claimed is:

1. In a process of reacting a glycol represented by the formula

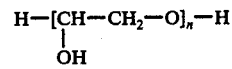

wherein $n$ is an integer from 1 to 5 and an alkyl epoxide represented by the formula

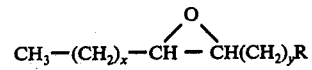

wherein $x$ and $y$ are each integers from 0 to 15, the sum of $x$ and $y$ being from 6 to 15 and R is hydrogen or $CH_3$, in the presence of a non-oxidizing strong acid catalyst, the improvement which comprises conducting the reaction in an aromatic hydrocarbon non-polar solvent containing from 6 to 12 carbon atoms wherein the solvent constitutes 5 to 50 percent by weight of the reaction mixture and the mole ratio of glycol to epoxide is at least 3 to 1.

2. The process of claim 1 wherein said solvent is benzene.

3. The process of claim 2 wherein the benzene constitutes from 30 percent to 50 percent by weight of the reaction mixture.

* * * * *